US010248139B2

(12) United States Patent
Surenbrock et al.

(10) Patent No.: US 10,248,139 B2
(45) Date of Patent: Apr. 2, 2019

(54) APPARATUS FOR THE APPLICATION OF A LIQUID OR VISCOUS MEDIUM

(71) Applicant: Illinois Tool Works Inc., Glenview, IL (US)

(72) Inventors: Michael Surenbrock, Viersen (DE); Thomas Grupe, Grefrath (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 221 days.

(21) Appl. No.: 15/311,105

(22) PCT Filed: Jul. 8, 2015

(86) PCT No.: PCT/US2015/039570
§ 371 (c)(1),
(2) Date: Nov. 14, 2016

(87) PCT Pub. No.: WO2016/007639
PCT Pub. Date: Jan. 14, 2016

(65) Prior Publication Data
US 2017/0083029 A1    Mar. 23, 2017

(30) Foreign Application Priority Data

Jul. 9, 2014  (EP) .................................. 14002353

(51) Int. Cl.
*B05C 5/00* (2006.01)
*B05C 5/02* (2006.01)
(Continued)

(52) U.S. Cl.
CPC ......... *G05D 7/0682* (2013.01); *B05C 5/0279* (2013.01); *B05C 11/1013* (2013.01);
(Continued)

(58) Field of Classification Search
CPC    G05D 7/0682; G05D 7/0652; G01F 25/0092; B05C 11/1013; B05C 11/1042
See application file for complete search history.

(56) References Cited

U.S. PATENT DOCUMENTS 3,511,579 A    5/1970  Gray et al.
4,682,710 A    7/1987  Turner, Jr. et al.
(Continued)

FOREIGN PATENT DOCUMENTS

FR    1394083 A    4/1965
GB    2504736 A    2/2014
(Continued)

*Primary Examiner* — Paul M. West
(74) *Attorney, Agent, or Firm* — Levenfeld Pearlstein, LLC

(57) ABSTRACT

Disclosed is an apparatus (10) for the application of a liquid to viscous medium (42) onto an application surface (53), comprising a port (14) for providing a connection between the apparatus (10) and a supply of said liquid to viscous medium (42) upstream of the apparatus (10), at least two volumetric delivery pumps (23) for metering volumes of said medium, said volumetric delivery pumps (23) being located downstream of said port (14), each volumetric delivery pump (23) being in fluid connection with an application valve (25) of the apparatus (10), located downstream of the volumetric delivery pump (23) for passing a metered volume of the medium (42) from the delivery pump (23) to said application valve (25). It is characteristic that the apparatus (10) comprises a flow meter (13) in fluid connection with said volumetric delivery pumps (23), which flow meter (13) is located upstream of said volumetric delivery pumps (23).

14 Claims, 5 Drawing Sheets

Figure 1:
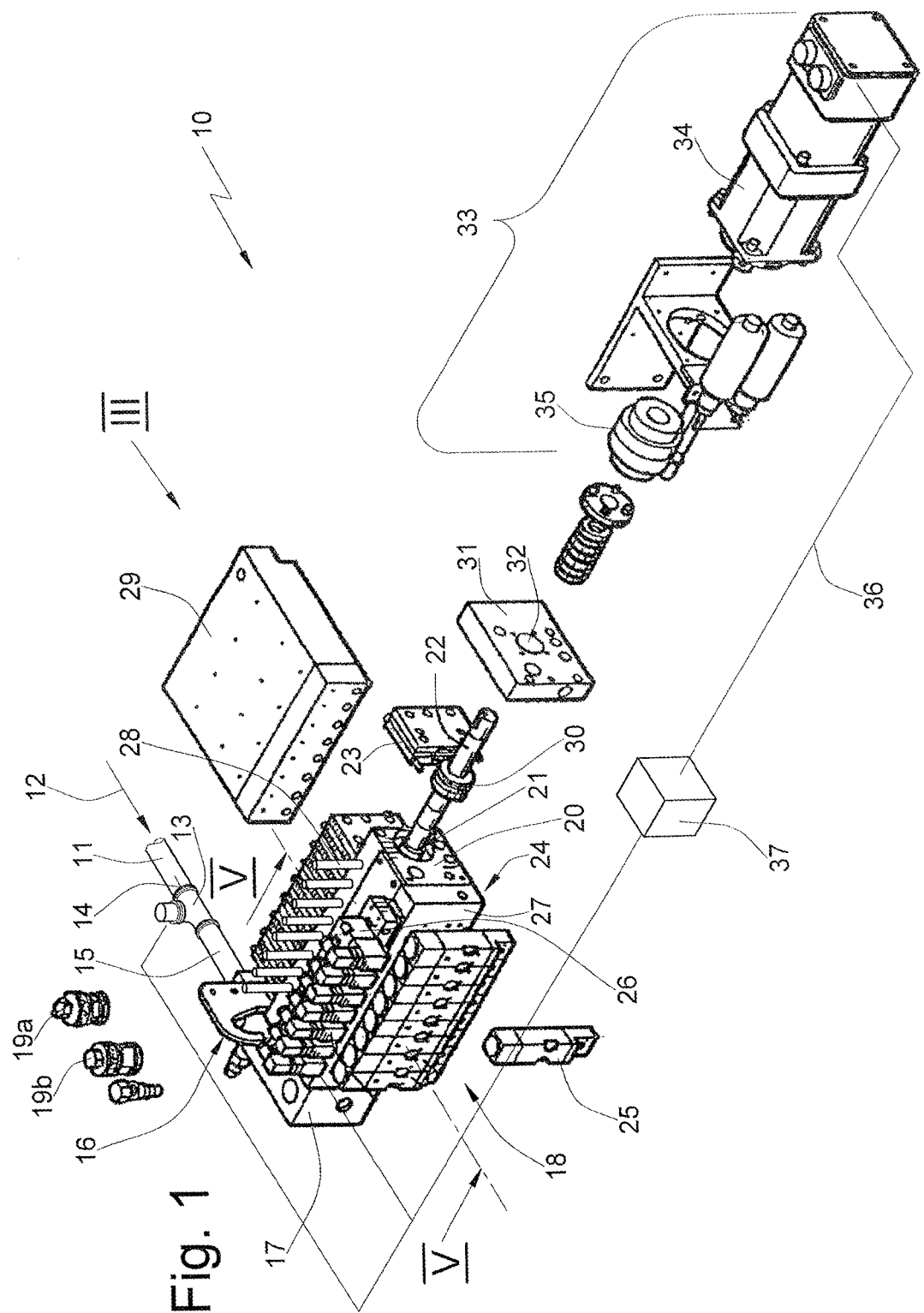

(51) Int. Cl.
  *F04C 2/14* (2006.01)
  *G05D 7/06* (2006.01)
  *B05B 15/40* (2018.01)
  *B05C 11/10* (2006.01)
  *F04B 23/04* (2006.01)
  *F04B 51/00* (2006.01)
  *F04C 14/28* (2006.01)
  *G01F 25/00* (2006.01)

(52) U.S. Cl.
  CPC .......... *B05C 11/1042* (2013.01); *F04B 23/04* (2013.01); *F04B 51/00* (2013.01); *F04C 2/14* (2013.01); *F04C 14/28* (2013.01); *G01F 25/0092* (2013.01); *G05D 7/0652* (2013.01); *B05B 15/40* (2018.02); *B05C 5/001* (2013.01)

(56) References Cited

U.S. PATENT DOCUMENTS

| | | | |
|---|---|---|---|
| 6,131,770 | A | 10/2000 | Allen |
| 2011/0014369 | A1* | 1/2011 | McGuffey ............. B05C 5/0225 427/207.1 |

FOREIGN PATENT DOCUMENTS

| | | |
|---|---|---|
| WO | 9801233 A1 | 1/1998 |
| WO | 2012083207 A2 | 6/2012 |

* cited by examiner

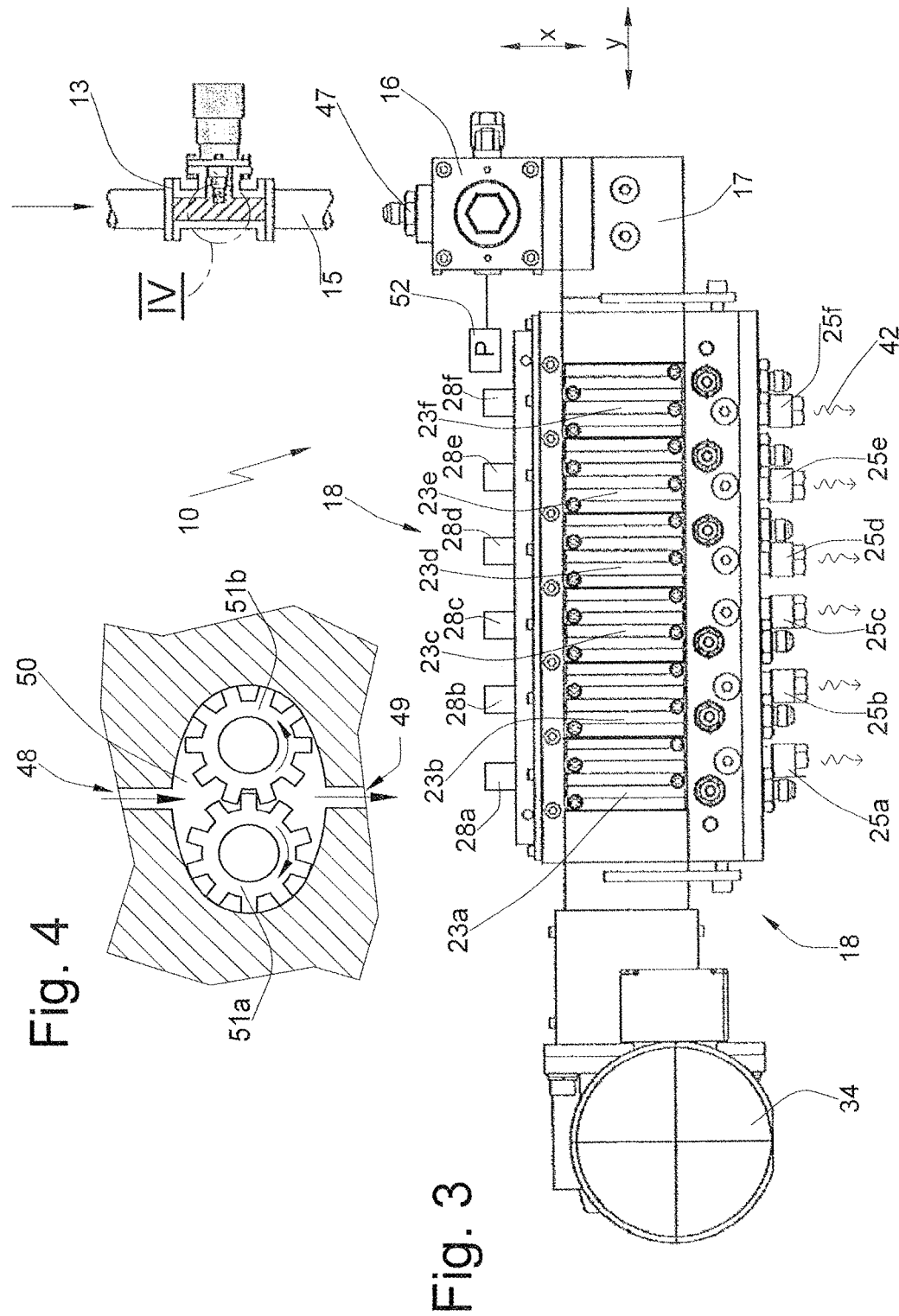

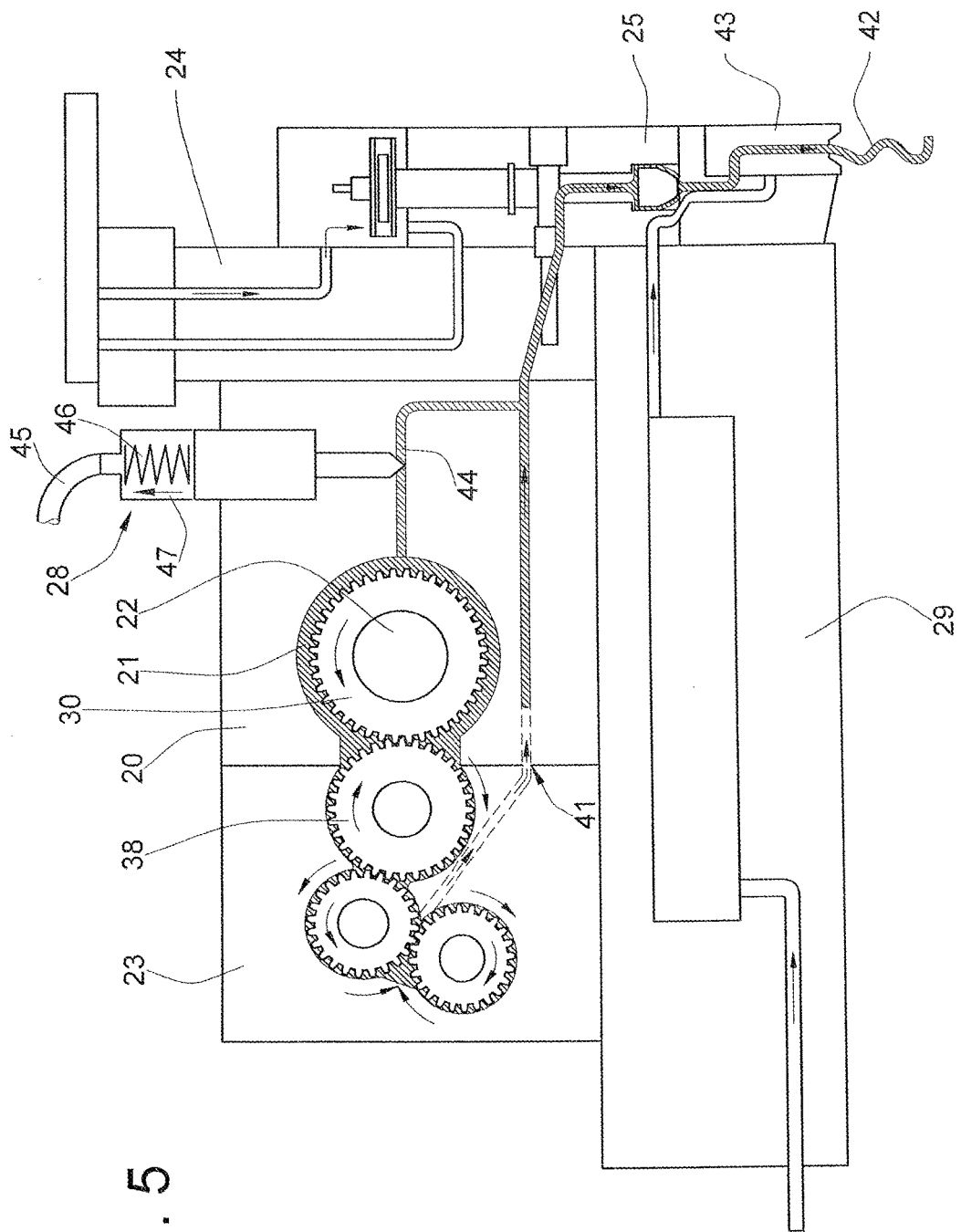

APPARATUS FOR THE APPLICATION OF A LIQUID OR VISCOUS MEDIUM

The invention relates to an apparatus for the application of a liquid or viscous medium (in particular a hot melt adhesive) onto an application surface and also to a method for calibrating and/or monitoring said apparatus (in particular its volumetric delivery pumps).

Corresponding application apparatuses, which can be designated in particular for the application of a molten adhesive or a heated, molten adhesive agent onto a substrate, are basically known from the prior art, for example from WO 2012/083207 A2 of the applicant.

Volumetric delivery pumps are used in such apparatuses for conveying the medium from an inlet or port to an application valve (located above an application surface or substrate). For monitoring purposes, tests are necessary for permanently checking the accuracy and functionality of the delivery pumps.

I.e. a so-called "cup test" may be manually performed by a responsible person. During this test cups are placed under the application valves of the apparatus to collect the medium applied by the valves during a pre-determined period of time. After the end of the period, the apparatus stops and the person may manually perform a weighing process for each cup to control the amount of medium applied by each valve during said period of time.

The result of said weighing process may then be compared to a reference amount the delivery pump connected to said application valve should theoretically convey during said period of time.

If the amounts are equal or nearly equal the person can conclude that the delivery pump connected to said application valve works fine. Otherwise it malfunctions. In the later case the person may perform maintenance of the according delivery pump.

While such a method of monitoring the volumetric delivery pumps in fact works well, it is time consuming.

Therefore in the prior art flow meters are used to automatically measure the amount of medium conveyed by a volumetric delivery pump to an outlet I.e. US 006 131 770 A discloses a system where a flow meter is located between a delivery pump and an outlet However, such an approach is in need of one flow meter per outlet or application valve. Considering a high number of outlets or application valves (which therefore would lead to a high number of separate flow meters) this would lead to high production costs of the apparatus.

Hence, the present disclosure provides an apparatus that allows for a comfortable monitoring of its volumetric delivery pumps while limiting the production costs.

The system of the present disclosure includes an apparatus that comprises a flow meter in fluid connection with said volumetric delivery pumps, which flow meter is located upstream of said volumetric delivery pumps.

Accordingly an aspect of the disclosure may be considered as providing a single, common flow meter for all of the pumps, which is not located between the pumps and according outlets (or application valves), but rather between the medium supply and the pumps (and therefore upstream of the pumps). Instead of one flow meter per application valve or outlet, the apparatus is provided with only one common flow meter for several or all of the pumps.

The amount of medium measured by the flow meter during a predefined period of time has to be equal to the sum of the amounts all opened application valves should have theoretically applicated. If these amounts are not equal, one may assume that at least one of the metering pumps malfunctions.

To precisely determine which of the several volumetric delivery pumps malfunctions, the apparatus may automatically perform a method during which all but one of the application valves are closed. The assumption is that the amount applicated by the single, opened application valve is equal to the amount measured by the flow meter during the same period of time. If the measured amount equals a reference value of the according delivery pump one may conclude that the corresponding delivery pump works fine. If the amounts/values do not equal, one may conclude that the corresponding delivery pump does not work correctly.

This method can be performed for each of the application valves successively, such that during such a monitoring process each application valve is opened once while the others are closed and the amount of medium it should theoretically have discharged is compared to the amount of medium metered by the flow meter.

Thus, the present disclosure provides an apparatus which may be called "self-monitoring" while being in need of only one common flow meter. This is because the flow meter is not located downstream of the delivery pumps but rather upstream of them.

The flow meter can be a flow meter as known in the art. In particular it may comprise two gear wheels. Fluid passing through the flow meter passes through these gear wheels while it is pivoting the gear wheels. The movement of the gear wheels may be detected by sensors. I.e. proximity sensors may be used to detect the passing of the teeth of the gear wheel. From this information and the known geometry of the gear wheels, the apparatus (in particular a control or detection system of the apparatus) may determine the amount of medium passing the flow meter during a predetermined period of time. In this sense the flow meter may be electronically connected to the apparatus control.

The flow meter can be located upstream of said volumetric delivery pumps and on the other hand downstream of the medium supply. The flow meter may either be directly integrated into the apparatus architecture.

Alternatively the flow meter may even be attachable to the rest of the apparatus in a modular way. In both cases the flow meter is a part of the apparatus.

The apparatus also comprises a port for providing a connection to a J5 supply of medium, which i.e. is a supply of hot melt adhesive. In this case the supply comprises heating means and even the connection between the apparatus and the supply comprises heating means. Finally, also the apparatus itself provides heating means where necessary for guaranteeing that the molten adhesive conveyed from the inlet port of the apparatus to the application valve stays molten.

The port or inlet port may be either located downstream or upstream of the flow meter. Alternatively also the flow meter itself may provide the port of the apparatus.

The apparatus can comprise at least two volumetric delivery pumps which means that generally several pumps are present Hence, there can be two, three, four or more delivery pumps used. With regard to the kind of application even more than ten or more than twenty delivery pumps may be used.

Generally all of the delivery pumps are in fluid connection with one common single flow meter. An alternative embodiment may even comprise two groups of delivery pumps, one group in fluid connection with a first fluid meter and a second group of delivery pumps in connection with a second fluid meter. This embodiment would especially make sense if a large number of pumps is used.

Volumetric delivery pumps are typically comprised by so-called "manifolds". In particular each manifold can be connected to a separate and single flow meter.

Within the context of the present disclosure, a volumetric delivery pump is to be understood in particular as a high precision pump which is suitable for highly precisely measuring out and passing on a desired volume of the medium. If the delivery pump in this case is designed as a gear pump, the delivery rate of the medium customarily behaves proportionally to the number of revolutions of the gear wheels, with it thereby being possible to very exactly meter the delivery grade (usually a gear pump has at least one driving and one metering gear wheel).

When the delivery pump is designed as a gear pump the drive may in particular drive a shaft with shaft gear wheels that are arranged thereon. Such a shaft gear wheel may interact with a driving gear wheel of the delivery pump in order to drive the gear pump.

In particular all volumetric delivery pumps may interact with the same shaft of the drive such that the pumps are actuated commonly and are not actuable separately. The drive may also be electronically connected to the control of the apparatus.

Such a control or controller of the apparatus may be, for example, a computer unit, in particular a memory-programmable controller, special controller or conventional personal computer which may also be assigned a monitor and an input unit, for example a key board, for manual operation or modification of the electronic controller. The control or controller in this case can activate the drive and may also receive information from the flow meter (in particular the results of its measuring).

The volumetric delivery pumps may in particular be comprised of two pump sub-units combined to a single pump with a single inlet and outlet. The sub-units may each comprise its own set of gears. In this way the composite pumps are configurable regarding their conveyed amount. I.e. if two identical sub-units of an output 0 are used, the overall convey output of the pump is 2x0 (in this way a gear pump may convey more than 6 cm$^3$/turn). On the other hand one of the sub-units may also be replaced by a dummy plate, such that the output of such a volumetric delivery pump would be 1x0.

In the sense of the application each volumetric delivery pump is in fluid connection with an application valve of the apparatus. This application valve can be switched between an open state and a closed state. In particular this is accomplished by pressurized air or even electronically. If the application valve is in an open state the medium may pass through the application valve and leave the apparatus or at least the application valve outlet. In particular a nozzle (i.e. a spraying nozzle) may provide the application valve outlet for applying the medium to an application surface (in particular a substrate underlying the apparatus). In another embodiment a hose may be connected to the application valve outlet such that the medium is not directly applicated onto an application surface beneath the application valve, but is firstly directed to a different location via the hose.

Each volumetric delivery pump is connected to one application valve. Hence, in the an embodiment there are several application valves, in particular as many application valves as volumetric delivery pumps.

Alternatively, in an embodiment one application valve is present.

According to an embodiment, the apparatus comprises a detection system which is coupled to the flow meter for detecting a malfunction of one or more delivery pumps by monitoring the measurements of the flow meter.

In particular the detection system may be provided by or incorporated into the electronic apparatus control. The detection system is coupled to the flow meter such that the flow meter (which measures the amount of medium passing through it) provides information to the detection system about the measured values.

As already described above, a malfunction of the delivery pump is detected in case the flow meter measures a value that is not equal to the sum of amounts that should theoretically be conveyed to open application valves by all of the volumetric delivery pumps.

In this case the detection system may initiate a warning signal. The warning signal may be a light signal of a lamp indicating to persons monitoring the apparatus that one of the pumps is not working properly. The warning signal may also be an acoustic signal. In a preferred embodiment the warning signal is presented to the user on a monitor which is related to the control of the apparatus. In a further embodiment the signal may also be transmitted to an electronic unit located away from the apparatus (i.e. via the internet or an extranet or the like).

In another embodiment the detection system may not only initiate a warning signal, but also provide a user with information which of the volumetric delivery pumps is not working properly. This could also be presented graphically on a monitor and is determined by the detection method described above.

According to an embodiment, each volumetric delivery pump is connected to a recirculation channel. The inlet of this recirculation channel is provided between a volumetric delivery pump and an according application valve. Accordingly, the recirculation channel can be closed and typically is closed (at least if the corresponding application valve is open). This embodiment allows for the inventive apparatus to provide the described self-monitoring processes. In particular, if such recirculation channels would not be present, the described monitoring or calibration process may not be possible or may only be possible with imprecise results.

This is because in case of the monitoring process, when all but one application valves are closed, still all pumps are driven by the same motor. Hence, since even the pumps whose application valve is closed convey fluid, the medium has to be conveyed somewhere, namely into the re-circulation channel.

The recirculation channels can be closable by pneumatic valves. These may be pneumatic pressure relief valves. In contrast to the pressure relief valves in the prior art (where only biased springs are used to close the valve), the pneumatic valves may be turned off to open the channel. In this case the recirculation channels are opened without the need of a high pressure (as with the prior art pressure relief valves). This allows for an optimized monitoring or calibration process, since the pumps do not have to provide the pressure to open the closed recirculation channels.

According to an embodiment, the fluid connection between the flow meter and the volumetric delivery pumps is provided by a rigid channel. This allows for the monitoring and calibration processes being more precise. If the flow meter would be connected to the pumps via a non-rigid channel, i.e. a hose, a pressure builtup in the connection could be absorbed by an expansion of the hose. This would complicate the monitoring process and there would be varying amounts of medium inside of the apparatus even for the same conveyance rates.

The flow meter can be rigidly mounted to a filter block of the apparatus. In this case the flow meter may be coupled or mounted directly to the filter block or may be connected to a rigid tube which is connected to the filter block. In each case the flow meter is typically located upstream of the filter block.

According to another embodiment of the invention the flow meter is mounted to the other parts of the apparatus via mounting means so that the flow meter is mountable in different directions with respect to the pumps or a manifold of the apparatus. This allows for an improved variability of the whole apparatus. I.e. a mounting block can be present that has different channels for mounting means (i.e. screws). Depending on which mounting channels are used, the block can be mounted in different orientations with regard to the manifold of the apparatus and hence also the flow meter is mounted differently. Alternatively the flow meter and/or filter block may be mounted to different sides of the mounting block While the apparatus may be theoretically used for the application of other liquid to viscous mediums than adhesives, a contemplated use of the apparatus is to apply hot melt adhesives to a substrate.

A further aspect of the disclosure relates to a method of calibrating or monitoring several volumetric delivery pumps of an apparatus for the application of a liquid to pasty medium to an application surface (in particular a hot melt adhesive onto a substrate).

Accordingly, the known method (i.e. the so-called "cup-test" described above) is improved to allow for a simple, yet cost effective way of calibrating and/or monitoring such an apparatus.

As such, a method comprises the following steps:
a) providing a flow meter in fluid connection with said volumetric delivery pumps upstream of said volumetric delivery pumps,
b) closing all but a single application valve,
c) actuating the volumetric delivery pump connected to said single application valve,
d) measuring the amount of medium passing through the flow meter for a predetermined period of time,
e) comparing the measured amount to a reference amount said delivery pump connected to said single application valve should theoretically convey during said period of time.

An aspect of the method is that a flow meter is located upstream of said volumetric delivery pumps. This allows for a single flow meter being used (in contrast to several flow meters being necessary if located downstream of the pumps) which is quite cost effective.

Moreover this method allows for an automation process. In particular the flow meter, as well as the application valves and the pumps and the motor of the pumps may be connected to a controller or detection system which allows to perform a monitoring or calibrating process automatically.

In such a process the control closes all but a single, first application S valve. Then the delivery pumps are actuated in particular by the control instructing a motor to actuate the pumps (which generally cooperate with the same drive shaft of the motor). Hence, according to step c) all of the volumetric delivery pumps may be actuated in this step. Alternatively, in another embodiment, only the delivery pump connected to said single, first open application valve may be actuated which would require another kind of drive.

As long as at least the volumetric delivery pump connected to the open application valve is actuated, the flow meter measures the amount of medium passing through it After a predetermined period of time the flow meter stops the measuring process (and the delivery pump can stop and/or the according application valve can be closed).

Now the amount measured by the flow meter is compared to a reference amount that said delivery pump connected to said single first open application valve should theoretically convey during said period of time. This comparison can be preferably performed by the control (though a manual comparison may be possible too).

From performing said method the system may automatically (or a user may manually) learn whether the examined volumetric delivery pump works fine or whether said pump conveys too much or too few medium. In the later cases the user may manually detach said delivery pump from the manifold and perform a repair process.

According to an embodiment said method just described is performed for all of the delivery pumps of the apparatus one after another. In this sense, after the amount conveyed by the delivery pump connected to said first application valve is determined, the amount conveyed by the second delivery pump is determined (while only the application valve connected to the second delivery pump is opened and the other application valves are closed). Then the amount of the third delivery pump is determined in a similar way and so on.

This allows for an automatic monitoring and/or calibrating process. In particular the control of the apparatus may initiate the actuating of the delivery pumps and the opening and the closing of the application valves as well as the control of the flow meter. Hence, the control may automatically monitor all of the delivery pumps and may, after performing such a method for all of the pumps, provide the user of the apparatus with information if all of the pumps work fine or whether some the pumps do not behave correctly. In particular the control may present information which pump behaves correctly and which not onto a monitor while also providing information how the pumps that malfunction work (either they convey too much or too few medium).

According to an embodiment, the described method is used to calibrate the volumetric delivery pumps. In this sense, for each application process the different delivery pumps may be of varying importance. I.e. in a certain application case the two outermost delivery pumps and/or application valves may be of higher importance than the inner pumps (this means that it is of high importance that the outer pumps convey exactly the amount of medium as their reference value implies).

In such a case, especially if all of the pumps are driven by the same motor, the control may measure the conveyance rates of all the delivery pumps as described above. Afterwards the control may adjust the power output of the motor driving the volumetric delivery pumps in a way that the two outer delivery pumps come closest to a reference value (while taking into account that the inner pumps probably deviate from their reference values). This may be performed automatically by the control or alternatively even manually by studying the conveyance rates provided by the flow meter and adjusting the motor output manually.

If the system encounters that one of the pumps does not work correctly, a signal will be generated, in particular by the control. This may be, as already described above, a visual or an acoustic signal or most likely a signal presented on a monitor in form of according data and warning signs.

According to an embodiment, in a second aspect, each of the delivery pumps is connected to a closable recirculation channel. Such channels are often present as pressure release channels (in case the valve is closed but the pump malfunctions and conveys medium in the direction of the closed application valve).

Such a recirculation channel is of desirable in case all of the pumps are actuated by the same driving shaft of the same motor. In this case, during the monitoring process described above, all of the pumps would be actuated simultaneously, while only one of the pumps is connected to an open application valve. Hence, the other valves are not connected to an open application valve but rather to a closed application valve. They may convey the medium nevertheless, which then flows into an opened recirculation channel and then flows back into a pool of medium, preferably upstream of the according delivery pump (but downstream of the flow meter). In this way the only medium that leaves the apparatus is that conveyed by the pump connected to the open valve. The flow meter allows the monitoring of said pump connected to the open valve.

In this sense each delivery pump comprises an own recirculation channel and each of these recirculation channels comprises a recirculation valve for closing and opening the channel. In particular the channel is closed by a recirculation valve if the application valve is open. On the other hand the recirculation valve is opened in case the application valve is closed and the according delivery pump is actuated.

Preferably the recirculation valve is a pneumatic valve. The recirculation valve may be applied by pressurized air in case the valve should be closed. If the recirculation valve should be opened, the pressurized air is turned off and a control spring forces the valve to open.

Figure 2:
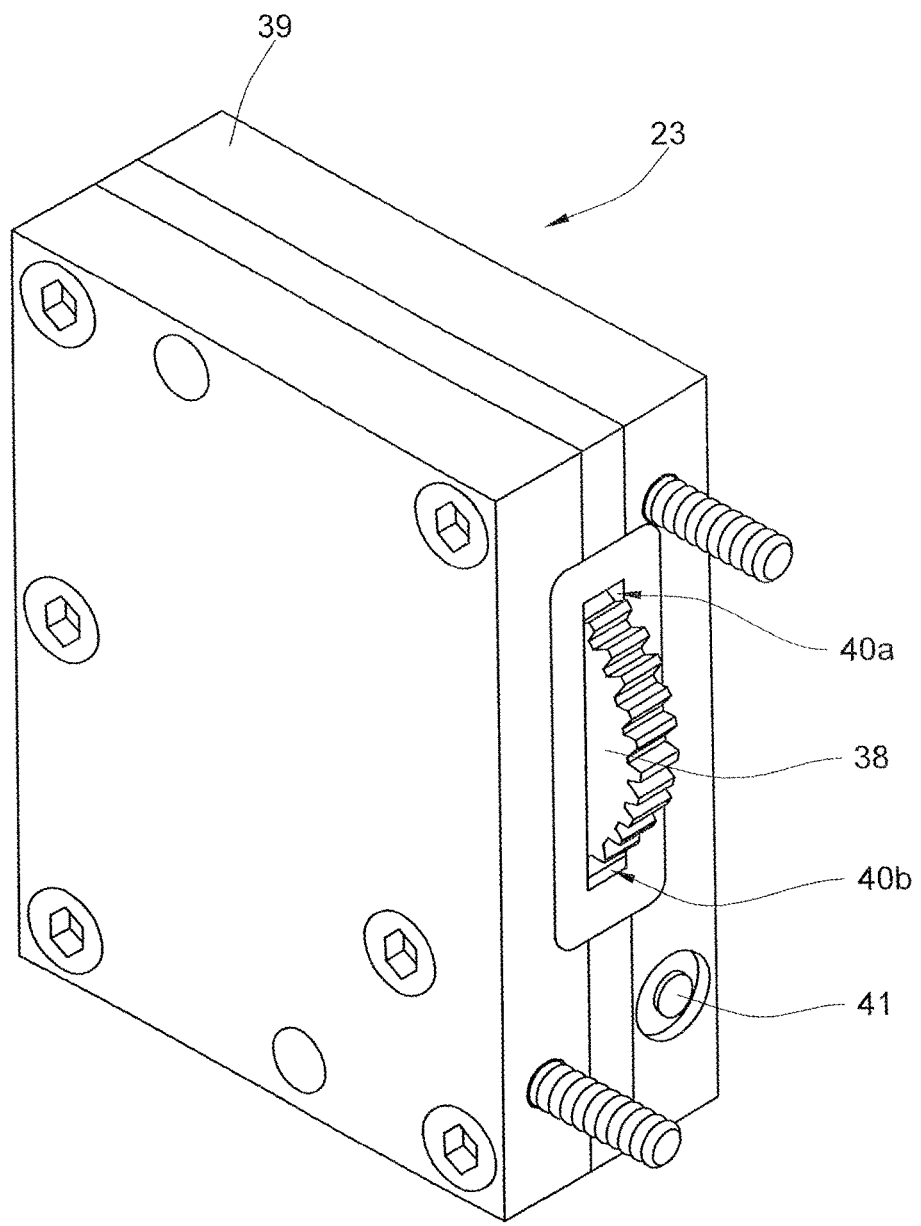

Further advantages of the present disclosure emerge with reference to the claims and from the description below of the exemplary embodiments which are illustrated in the drawings, in which FIG. 1 shows a highly schematic exploded illustration of an apparatus according to the invention for the application of a hot melt adhesive onto a substrate (not illustrated), FIG. 2 shows an enlarged schematic view of a volumetric delivery pump of an apparatus according to FIG. 1, which is in the form of a gear pump and which has a driving gear wheel that protrudes out of the housing and can interact with a shaft gear wheel of a drive shaft (not illustrated in FIG. 2), FIG. 3 shows a back view of the embodiment shown in FIG. 1 approximately along the arrow III in FIG. 1 with fewer delivery pumps being mounted and without displaying the air heater module and with the mounting block being mounted in a different angle of approximately 90 degree which leads to also the flow meter being mounted in a different direction, FIG. 4 shows a schematic view of a part of the flow meter according to the circle IV in FIG. 3, FIG. 5 shows in a highly schematic view a sectional illustration through the embodiment according to FIGS. 1 and 3, approximately according to the viewing arrows V in FIG. 1, the application module being in an open state with the gear pump being driven, FIG. 6 a very schematic view of a diaper and three application nozzles of the embodiment shown in FIG. 1 and FIG. 3.

The apparatus is denoted in its entirety by reference number 10 in the figures (especially FIG. 1 and FIG. 3). For the sake of clarity, it has to be mentioned that identical or comparable parts or elements, even if different exemplary embodiments are concerned, are denoted by the same reference number, sometimes with the addition of small letters or apostrophes.

The apparatus 10 illustrated in FIG. 1 is an apparatus for the application of a molten hot melt adhesive onto a two-dimensional substrate, in particular a non-woven capable of being in web form. In this sense FIG. 1 shows an exploded view in which the individual components of the apparatus 10 are illustrated partially disassembled.

According to FIG. 1, the apparatus 10 has a fluid connection 11 for introducing a molten hot melt adhesive or a similar medium into the apparatus 10. The fluid connection 11 is a delivery hose in the shown embodiment which is connected to a reservoir or supply (not illustrated). The molten hot melt adhesive is conducted to the apparatus 10 along a direction 12. The apparatus 10 therefore is located downstream of the supply.

The supply may be, in particular, a hot melt unit which melts solid adhesive material and then passes said material on via the heated hose 11. For this purpose the supply may also have a main delivery pump which ensures that the apparatus 10 is always supplied with sufficiently molten adhesive.

The adhesive then enters the apparatus 10 via a flow meter 13, while the inlet of the flow meter 13 provides a port 14 through which the adhesive may enter the apparatus 10.

While the flow meter may meter the amount of adhesive flowing through it, this metering process is described in detail further down below.

After passing through the flow meter 13 the adhesive enters a tube 15 which connects the flow meter 13 to a filter block 16 for filtering the adhesive before it enters the other parts of the apparatus 10.

While this filter block 16 is not explicitly shown in FIG. 1, reference is made to FIG. 3 for a better understanding of the filter block.

As can be seen in FIG. 1 the tube 15 provides a direct connection between the flow meter 13 and the filter block 16. In this sense it has to be mentioned that the tube 15 is rigid (in contrast to the hose 11) such that the adhesive passing through the tube 15 may not expand the channel that it is passing (as with the hose 11).

Instead of a rigid tube 15 the flow meter 13 may alternatively be directly mounted to the filter block 16. However it is desirable that there is a rigid connection between the flow meter 13 and the filter block 16.

The filter block 16 is provided with interchangeable filter elements 19*a* and 19*b*, which can filter the fluid in respect of impurities such that deposits and clogging do not occur in the apparatus 10.

After passing the filter block 16 the adhesive may enter a mounting block 17 which allows the mounting of the filter block 16 and the flow meter 13 to a main manifold 18 of the apparatus 10.

The manifold 18 consists of a central driving block 20, which has, in the longitudinal direction thereof, a central passage channel 21 through which the fluid or adhesive can pass the manifold 18.

Furthermore, the passage channel 21 serves to receive a drive shaft 22 which has yet to be described in more detail further below.

In addition, on a rear side (which cannot be seen in FIG. 1), the driving block 20 has connecting options for volumetric delivery pumps 23, wherein, in FIG. 1, eight such delivery pumps 23 are already arranged on the driving block 20 and one volumetric delivery pump 23 is illustrated still in an unfitted state. The volumetric delivery pumps 22 are also described in more detail below.

On a front side which is concealed in FIG. 1 an adapter block 24 is mounted, substantially congruently, to the driving block 20. Said adapter block 24 serves for the mounting of application modules or application valves 25 and also of compressed air modules 26 for driving the valves 25 between an open and a closed state.

In the view according to FIG. 1, eight application valves 25 and eight compressed air modules 26 are already fitted on the adapter block 24 and on the apparatus 10, respectively, while one application valve 25 is illustrated in a non-assembled state. The application valves 25 are mounted on a side wall 27 of the adapter block 24 and the compressed air modules 26 may be mounted on an upper side of the adapter block 24.

In FIG. 1 it is also shown in a very schematic fashion that pneumatic recirculation valves 28 protrude from the top of the driving block 20. These recirculation valves 28 are discussed in more detail further below and are connected to hoses 45 which provide pressurized air (not shown in FIG. 1).

The apparatus 10 furthermore comprises a heater module 29 which can be fitted under the driving block 20 and the adapter block 24 and serves to heat spraying air conducted through the air heater module 29. The spraying air can be dispended to the lower outputs or lower outlets of the application valves 25 (which can also be called nozzles) in order to serve as carriers for the fluid/adhesive to be discharged. For the adhesive not being already cooled during the discharge and spraying process, the carrier air is preheated in the air heater 29.

The drive shaft 22, which has already been mentioned and which is located inside the passage channel 21 of the driving block 20, is assigned a number of shaft gear wheels 30 (in particular corresponding to the number of delivery pumps 23 provided). Only one of said shaft gear wheels 30 can be seen from FIG. 1. However, it should be noted that the drive shaft 22 provides one shaft gear wheel 30 per delivery pump 23.

In order to assemble the apparatus 10 a closing plate 31 is provided, the closing plate 31 being able to be plugged over the end section of the shaft 22 and having a central opening 32 through which the drive shaft 22 can interact with a driving motor unit 33. In the shown embodiment said motor unit 33 comprises a servo motor 34 which is able to drive the drive shaft 22, for example, via a coupling 35 (not specified in more detail).

The motor 34 is connected via an electronic connection line 36 to a controller or a machine control 37 which may be designed as a computer unit This computer unit or control 37 is connected via further lines to the application valves 25 and also to the flow meter 13.

It should be noted that in the fitted state of the apparatus 10 each shaft gear wheel 13 engages a driving gear wheel 38 of a delivery pump 23 which is illustrated in enlarged form in FIG. 2.

A medium passing through the passage channel 21 (not illustrated in FIG. 2) can enter the housing 39 of the otherwise encapsulated delivery pump 23 at entry points 40a and 40b. After being conveyed the medium may leave the housing through an outlet 41 to be conveyed to the application valve 25 as can be seen in FIG. 5.

From FIG. 5 it can also be seen that the application valve 25 can be switched between a closed state (not shown) and an open state (as shown in FIG. 5) by using pressurized air which is conveyed through the adapter block 24 into the application valve 25 (and originates from the compressed air module 26 as shown in FIG. 1). If the application valve 25 is switched from the closed state to an open state as shown in FIG. 5 the adhesive 42 may leave the application valve 25 through a nozzle 43. Instead of the nozzle 43 the application valve could alternatively be connected to a further conveying hose which leads to a nozzle located at a certain distance.

FIG. 5 also shows that spraying air, especially heated spraying air, is provided to the nozzle 43 by the air heater 29.

A feature, disclosed in FIG. 5, is a recirculating channel 44, which is closed according to FIG. 5 by a pneumatic recirculation valve 28. The recirculation channel 44 is starting downstream of the delivery pump 23 and is leading to a position in the apparatus upstream of the delivery pump 23, namely back to the central passage channel 21.

The recirculation valve 28 switches to an open state in case the application valve 25 is closed and the pump 23 is active. For switching the recirculation valve 28 to an open state pressurized air which is conveyed to the recirculation valve 28 via a hose 45 can be turned off such that the spring 46 forces the recirculation valve 28 into an open state (not shown) along the arrow 47.

FIG. 3 shows the embodiment according to FIG. 1 in a back view, approximately according to arrow III in FIG. 1, while some of the parts shown in FIG. 1 have been removed for clarity of illustration and understanding.

For example the air heater 29 is not shown. What can be seen from FIG. 3 is that the mounting block 17 is mounted to the manifold 18 in a different angle than in FIG. 1. This results in the filter block 16 and the flow meter 13 being directed in a vertical direction x rather than in a horizontal direction y according to FIG. 1.

This allows for a very flexible arrangement of the whole apparatus 10.

For achieving this goal either the mounting block 17 itself can be mounted to the manifold 18 using different mounting surfaces. Alternatively the mounting block 17 can always be mounted to the manifold 18 in the same way, but the filter block 16 can be mounted to different surfaces of the mounting block 17. In both cases the mounting block 17 is designed in a way to allow the flow meter (and also the filter block 16) to be connected to the manifold 18 in different directions. In particular the mounting block 17 may provide different mounting channels on different mounting surfaces. These could be used optionally together with mounting means, as mounting screws or mounting pins or the like.

According to FIG. 3 the flow meter 13 may be mounted to the filter block 16 either by using the rigid tube 15 (which is represented broken) or alternatively can be directly mounted to a mounting portion 47 of the filter block 16.

FIG. 4 is a more detailed, yet schematic view of the inner parts of the flow meter 13. In particular there is an inlet 48 as well as an outlet 49 of the flow meter 13 shown in FIG. 4. Both inlet 48 and outlet 49 are connected to a central cavity 50 which holds two metering gears 51a and 51b. The whole amount of adhesive passing through the flow meter 13 has to pass through the teeth of the metering gears 51. An impulse caused by the flow can be detected by sensors (not shown). I.e. a proximity sensor may count the number of teeth passing for allowing conclusions about the amount of medium or adhesive passing through the gears 51 of the flow meter 13.

Returning to FIG. 3, a pressure sensor 52 is shown in the area of the filter block 16 to always monitor the constant medium pressure applicated to the whole apparatus 10. The pressure sensor 52 is located upstream of the manifold 18 and in particular downstream of the flow meter 13. It provides the function to monitor the fluid pressure applied to the whole apparatus and in particular to the manifold 18. While in theory fluctuations in the pressure applied to the manifold 18 have no consequences for the inventive methods, practice has shown that indeed a constant pressure over the time period the flow meter 13 is active, delivers more reliable results.

In the following a monitoring process of the delivery pumps 23 should be explained in further detail:

According to FIG. 3 a manifold 18 is shown with six volumetric delivery pumps 23a, 23b, 23c, 23d, 23e, 23f being mounted to it. Each of the delivery pumps 23a, 23b, 23c, 23d, 23e, 23f is explicitly connected to a single corresponding application valve 25a, 25b, 25c, 25d, 25e, 25f.

In case the user expects one of the delivery pumps 23 not to work properly or just in case of a regular monitoring, the apparatus 10 may by itself perform a monitoring process. According to this process the controller 37 of the apparatus 10 as shown in FIG. 1 initiates the application valves 25b to 25f according to FIG. 3 to be closed, while the application valve 25a stays open. Moreover the controller 37 initiates the motor 34 to drive all the drive pumps 23a, 23b, 23c, 23d, 23e, 23f.

Also the controller 37 initiates the recirculation valves 28b, 28c, 28d, 28e, 28f according to FIGS. 3 and 5 to open, by turning off their according pressurized air. The recirculation valve 28a stays closed, since pressurized air is continuously applied.

Finally, the control 37 initiates the flow meter 13 to measure the amount of fluid or adhesive passing through it for a predetermined period of time.

During this process medium is only leaving the apparatus 10 through the nozzle of the application valve 25a since application valves 25b, 25c, 25d, 25e, 25f are closed. The fluid conveyed by the delivery pumps 23b, 23c, 23d, 23e, 23f is conveyed through the according opened recirculation channels 44 instead and enters a supply downstream of the flow meter 13 and upstream of the pumps or is directly let into the main medium channel 21.

In this way the same amount that leaves the apparatus 10 through the only open application valve 25a also has to enter the apparatus through the flow meter 13. Hence, the flow meter 13 meters or measures the amount that is indeed conveyed by the delivery pump 23a.

After the end of said predetermined period of time, the flow meter provides the control 37 with signals or information about the measured amount of medium.

Also the control initiates that the application valve 25a is closed and the next application valve 25b is opened. Accordingly the recirculation channel 44 connected to the first pump 23a (and the application valve 25a) is opened and the channel 44 connected to pump 23b (and application valve 25b) is closed.

Then the flow meter 13 performs a measurement for the delivery pump 23b.

This cycle is repeated for the other measuring pumps 23c, 23d, 23e, 23f.

After the whole process has been terminated, the control 37 may provide to the user information about the status of the delivery pumps 23. I.e. the control 37 can provide information (on a monitor) which of the valves conveys an amount of medium that equals a reference amount and which does not. These are obviously to be repaired.

Besides the monitoring process, the disclosed apparatus may also perform a calibrating process on its own.

Figure 6:
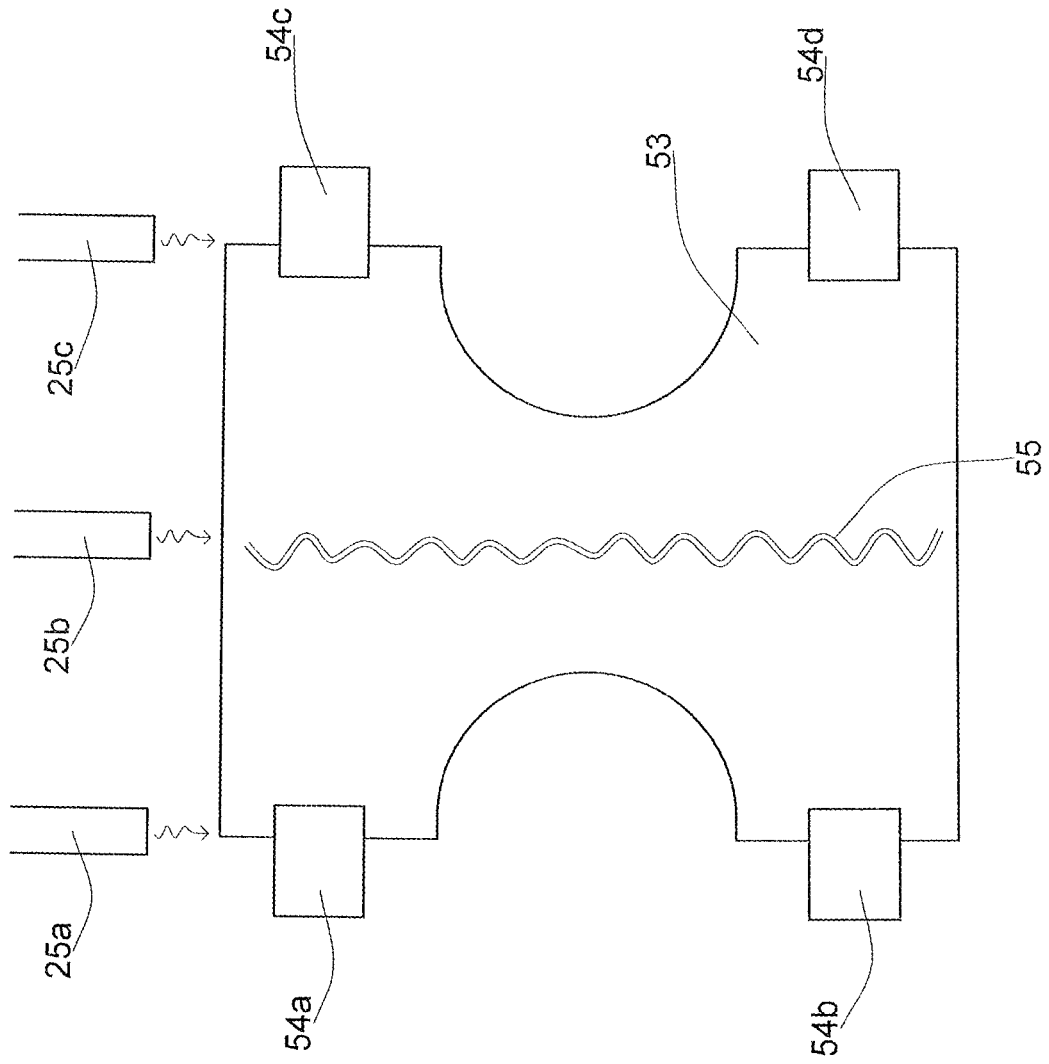

In this sense FIG. 6 shows an example of a diaper 53 with four strips 54a, 54b, 54c, 54d that have to be adhered to the diaper 53 as well as a single central strand 55 which also has to be adhered to the diaper 53.

For providing the substrate of the diaper 53 with adhesive, only the three first application valves 25a, 25b, 25c according to FIG. 3 are used. The application valves 25d, 25e, 25f are not used and they are simply closed or unmounted from the manifold 18.

Returning to FIG. 6 it has to be mentioned that the adhesion of the strips 54 is more important to the quality of the diaper 53 than the adhesion of the elastic strand 55. Hence, it is more important that the outer application valves 25a and 25c apply a very precise amount of adhesive than that the central application valve 25b applies a precise amount. Hence, a monitoring process as described above can be performed for all of the three application valves 25a, 25b, 25c shown in FIG. 6.

After finishing the monitoring process a calibration process can be started in a way that the power output of the motor 34 driving the drive shaft 22 (and therefore also the delivery pumps 25) can be adjusted. Since all delivery pumps 25a, 25b, 25c are connected to the same drive shaft 22 and the same motor 34 they can all only be adjusted the same way. Either all of the pumps 25a, 25b, 25c are adjusted to convey more adhesive or they are adjusted in a way that all of them convey less adhesive.

If said monitoring process provides results that indicate that the central application valve 25b works correctly, but that the outer (and more important) application valves 25a and 25b convey too much medium, the control (or alternatively a user) may instruct the motor to provide less output such that the outer application valves 25a and 25c convey the correct amount of medium (while on the other hand it is accepted that the central application valve 25b has a lesser output than desired, knowing that the output of the application valves 25a and 25c is more important to be precise).

In this way a simple and even automated method of performing a calibration of the apparatus 10 is provided.

Finally it should be noted that in the description of the figures the term "adhesive" or "hot melt adhesive" is only used exemplary and could at all instances be substituted by the term "medium" and visa versa.

The invention claimed is:

1. An apparatus for the application of a liquid to viscous medium onto an application surface, comprising:
    a port for providing a connection between the apparatus and a supply of said liquid to pasty medium upstream of the apparatus;
    at least two volumetric delivery pumps for metering volumes of said medium, said volumetric delivery pumps being located downstream of said port,
    each volumetric delivery pump being in fluid connection with an application valve of the apparatus, located downstream of the volumetric delivery pump for passing a metered volume of the medium from the delivery pump to said application valve,
    wherein the apparatus comprises a flow meter in fluid connection with said volumetric delivery pumps, which flow meter is located upstream of said volumetric delivery pumps, and
    wherein the flow meter is rigidly mounted to a filter block of the apparatus.

2. An apparatus for the application of a liquid to viscous medium onto an application surface, comprising:
    a port for providing a connection between the apparatus and a supply of said liquid to pasty medium upstream of the apparatus;

at least two volumetric delivery pumps for metering volumes of said medium, said volumetric delivery pumps being located downstream of said port, each volumetric delivery pump being in fluid connection with an application valve of the apparatus, located downstream of the volumetric delivery pump for passing a metered volume of the medium from the delivery pump to said application valve, wherein the apparatus comprises a flow meter in fluid connection with said volumetric delivery pumps, which flow meter is located upstream of said volumetric delivery pumps, and wherein said apparatus is a hot melt adhesive application apparatus and the liquid to viscous medium is a hot melt adhesive.

3. The apparatus of claim 2, further comprising a detection system coupled to the flow meter for detecting a malfunction of the delivery pumps by monitoring the measurements of the flow meter.

4. The apparatus of claim 3, wherein the detection system initiates a warning signal in case the measurements of the flow meter fall below a predetermined threshold value.

5. The apparatus of claim 2, wherein each volumetric delivery pump is connected to a closable recirculation channel with the inlet of the recirculation channel being located downstream of the according volumetric delivery pump but upstream of the application valve.

6. The apparatus of claim 5, wherein the recirculation channel is closable by a pneumatic valve.

7. The apparatus of claim 2, wherein the fluid connection between the flow meter and said volumetric delivery pumps is provided by a rigid channel.

8. The apparatus of claim 2, wherein the apparatus includes mounting means for the flow meter which are mountable in different directions with respect to a manifold of the apparatus.

9. A method of calibrating and/or monitoring at least two volumetric delivery pumps of an apparatus for the application of a liquid to viscous medium onto an application surface, each volumetric delivery pump being in fluid connection with a separate application valve of the apparatus, located downstream of the delivery pump for passing a metered volume of the medium from the delivery pump to said application valve, the method comprising:
  a) providing a flow meter in fluid connection with said volumetric delivery pumps upstream of said volumetric delivery pumps;
  b) closing all but a single application valve;
  c) actuating the volumetric delivery pump connected to said single application valve;
  d) measuring the amount of medium passing through the flow meter for a predetermined period of time; and
  e) comparing the measured amount to a reference amount said delivery pump connected to said single application valve should theoretically convey during said period of time.

10. The method of claim 9, further comprising the step of performing steps b) to e) for each further valve.

11. The method of claim 10, further comprising the step of calibrating the volumetric delivery pumps by regulating a common motor driving all the pumps under consideration of the importance of the different volumetric delivery pumps for the application process.

12. The method of claim 9, further comprising the step of generating a signal in case the comparison under step e) results in a difference in an amount that exceeds a predetermined threshold value.

13. The method of claim 9, wherein each pair of volumetric delivery pump and according application valve is connected to a closable recirculation channel, with an inlet of the recirculation channel being located downstream of a respective volumetric delivery pump but upstream of the respective application valve, and wherein during step b) the recirculation channels connected to the closed application valves are opened, by turning off pneumatic recirculation valves assigned to each recirculation channel.

14. The method of claim 9, wherein said apparatus is a hot melt adhesive application apparatus and the liquid to viscous medium is a hot melt adhesive.

* * * * *